June 22, 1965   R. S. KAMPF   3,190,420
ELECTROMAGNETIC FRICTION CLUTCH
Filed Feb. 26, 1962

INVENTOR.
RICHARD S. KAMPF
BY
ATTORNEY.

United States Patent Office 3,190,420
Patented June 22, 1965

3,190,420
ELECTROMAGNETIC FRICTION CLUTCH
Richard S. Kampf, Denver, Colo., assignor to Honeywell Inc., a corporation of Delaware
Filed Feb. 26, 1962, Ser. No. 175,456
4 Claims. (Cl. 192—84)

This invention relates to a connecting and disconnecting device such as an electric clutch or brake and, more specifically, to a device of this kind which has a stationary field or electromagnet comprised of a coil and a path for the magnetic flux. A rotating armature cooperates with this fixed field. By the use of such fixed field the use of slip rings, which are necessary to conduct electricity to a rotating field, are eliminated.

It is an object of this invention to provide a small electric clutch or brake having a fixed field or electromagnet comprising a coil and a path for the magnetic flux.

It is a further object of this invention to provide a small electric clutch or brake in which the necessary air gaps between the field and the armature are so arranged that the flux passes through the air gap in the direction of movement of the armature and in which a flow of flux transverse to the direction of movement of the armature is minimized.

Figure 1:
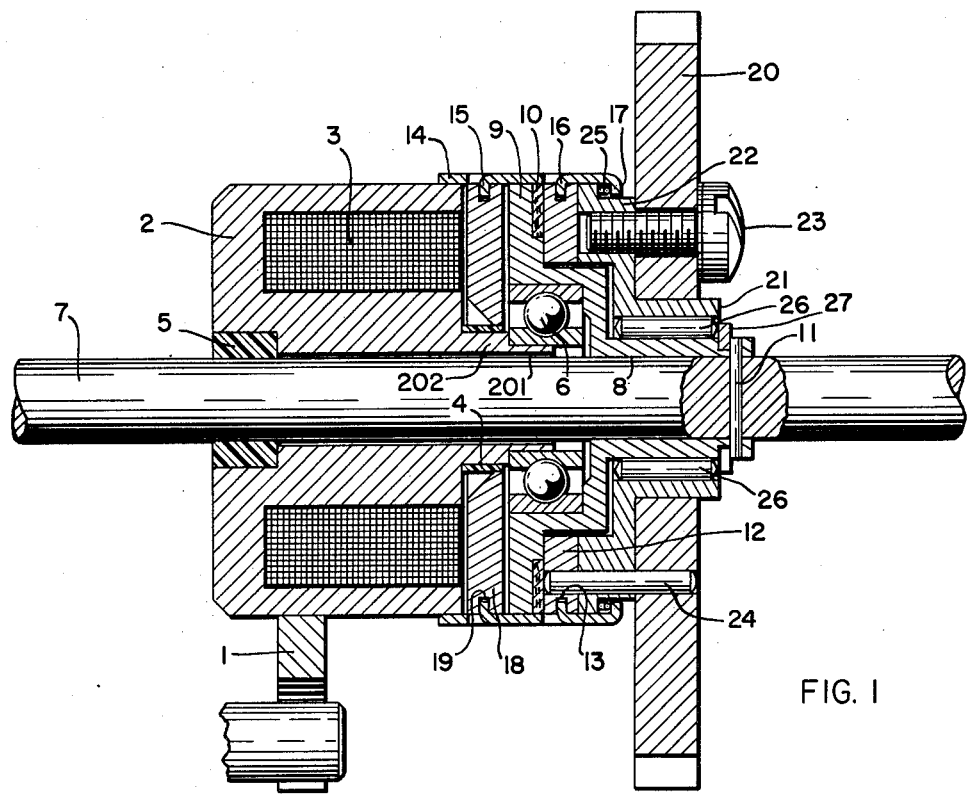
Figure 2:

A better understanding of the present invention may be had from the following detailed description when read in connection with the accompanying drawing, in which:

FIG. 1 of the drawing is a longitudinal cross section; and FIG. 2 is a development of the return spring 25 shown in FIG. 1.

The small electric clutch or brake of this invention comprises a supporting arm 1 upon which the device is mounted. A housing 2 is closed at its left end but open at its right end so as to provide a ring-shaped opening in it. A flange 201 projects from the right end of the housing 2 and is supported on an intermediate flange 202 of somewhat greater thickness. A coil 3 of wire which will conduct electricity is located in the opening in the housing 2.

An anti-friction, non-magnetic bushing 4 is pressed on the intermediate flange 202 of magnet housing 2 and serves to center the armature 18 (hereinafter described).

A sleeve bearing 5 is mounted on the left end of the magnet housing 2. A ball bearing 6 is mounted on the flange 201 of the magnet housing 2 at the right end. These two bearings 5 and 6 support the housing on shaft 7 and allow the housing to be held stationary by means of a supporting arm 1. Clearance is provided between the magnet housing 2 and the shaft 7. The internal diameter of the ball bearing 6 is larger than the external diameter of the shaft 7 and allows the extension of the magnet housing 2 to extend into the ball bearing 6 but without contacting the shaft 7.

A shaft hub 8 is mounted on shaft 7 and has a flange 9 thereon. A ring of friction material 10 is secured to the right face of the flange 9. A key 11 secures the shaft hub 8 to the shaft 7.

A friction ring 12 having a circumferential slot 13 in its rim has one face thereof, which extends radially of shaft 7, confronting flange 9 of shaft hub 8. A tubular retainer ring 14 has a plurality of radially extending tabs 16 which extend into slot 13 in friction ring 12. An armature 18 having a circumferential slot 19 in the rim thereof is centered by means of bushing 4 which minimizes the amount of radial flux that can enter the armature 18 from the flange 202 of the housing 2 which the armature 18 encircles. Radial flux entering the armature is undesirable as it does not create any axial pull on the armature. The retainer ring 14 has radial tabs 15 which extend into the circumferential slot 19 in the armature 18.

A gear or pulley 20 has a gear or pulley hub 21 mounted for rotation on shaft hub 8 by means of a pin roller bearing 26. Hub 21 has a flange 22 to which gear or pulley 20 is secured by one or more screws 23. Flange 22 has a plurality of pins 24 on it which extend through holes in friction ring 12 so that the friction ring 12 may be driven by gear or pulley 20 but still be free to move back and forth axially.

A return spring 25 has a slight wave in it parallel to the axis of shaft 7. Return spring 25 is located between flange 22 and radial tabs 17 on retainer ring 14. Return spring 25 pulls armature 18 to the right away from magnet housing 2 and pulls friction ring 12 to the right away from flange 9, when the magnet is deenergized.

A retaining ring 27 keeps pin roller bearing 26 and gear or pulley hub 21 in place.

The shaft 7 may serve as the input or the output to the device and conversely the gear or pulley 20 can serve as the output or the input to the device.

The device may be made to serve as a brake by fixing either the shaft 7 or the gear or pulley 20 so that when ring 12 engages the friction material 10 movable element 7 or 20 is held by the fixed element 20 or 7.

The operation of this clutch or brake is as follows. When coil 3 is electrically energized, magnet housing 2 becomes a magent with the pole faces being the inner and outer rings at the right end, which are formed by the recess for the coil 3. The passage of electricity through the coil 3 creates magnetic flux in the magnet housing 2. This flux attracts the armature 18 and creates an axial pull to engage the friction ring 12 with the friction material 10 on the flange 9 of shaft hub 8. This, in turn, affords a mechanical connection of the gear or pulley 20 to the shaft 7.

Since the bushing 4 is of non-magnetic material, it minimizes the amount of radial flux that can enter the armature 18 from the flange 202 of the magnet housing 2 on which the bushing 4 is mounted.

An axial air gap is always maintained between the armature 18 and the pole faces of the magnet housing 2. There is never any mechanical connection between these two. Consequently the armature 18 is free to rotate while the magnet housing 2 is stationary even when energized.

The ball bearing 6 holds a fixed separation between the magnet housing 2 and the shaft hub 8 and absorbs all the axial pull that develops between the armature 18 and the magnet housing 2 when the latter is electrically energized. The armature 18 and the friction ring 12 are mechanically linked together by the retainer ring 14 and the tabs 15 and 16 thereon so that they act mechanically as a unit. Therefore, as armature 18 is pulled toward magnet housing 2, friction ring 12 is pulled against the friction material 10 on flange 9 of shaft hub 8 and thus engages the clutch or brake.

Pins 24 on gear or pulley hub 21 extend through clearance holes in friction ring 12 so that friction ring 12 may be rotated by gear or pulley hub 21 but still be free to move back and forth axially. Pin or roller bearing 26 is pressed into gear or pulley hub 21 which, in turn, is free to turn on shaft hub 8. Gear or pulley 20 is attached to gear or pulley hub 21 by means of a plurality of screws 23. Thus, friction ring 12 is driven by gear or pulley 20 but is still free to move back and forth axially. Therefore, when the magnet housing 2 is energized, the friction surfaces are engaged, thereby creating the frictional link between gear or pulley 20 and the shaft 7.

What is claimed is:

1. A connecting device including in combination, a movable element, a cooperating element, a stationary housing of material suitable for conducting magnetic flux and having pole faces thereon, a coil of electrically conducting wire wound on said housing so as to induce a magnetic flux in said housing when said magnetic coil is energized, a retainer ring slidably mounted on said device, an armature mounted for limited movement adjacent the pole faces of said housing, means securing said retainer ring to said armature so that said retainer ring is moved by said armature, a hub fixed to one of said elements, a friction ring having connection with the other of said elements and mounted on said device for limited movement toward and away from said hub, and means connecting said friction ring to said retainer ring so that, when said armature is moved, said retainer ring is moved relative to said hub to connect or disconnect said elements.

2. A small electric clutch comprising, a stationary housing of material adapted to conduct magnetic flux and having an open end providing pole faces, a coil of electrically connecting wire located in the opening in said housing and adapted to create a magnetic flux in said housing when said coil is electrically energized, a shaft projecting through and spaced from said housing, a sleeve bearing mounting said shaft in said housing, a ball bearing mounted on said housing, a shaft hub secured to said shaft and mounted on said ball bearing for rotation and having a flange, a ring of friction material on said flange, a ring-shaped armature located opposite the pole faces of said housing for limited movement relative thereto, a pin or roller bearing mounted on said shaft hub, a movable element mounted on said pin or roller bearing and having a flange thereon, a plurality of pins mounted on said movable element and extending parallel to said shaft, a friction ring slidably mounted on said pins and held thereby against rotation relative to said movable element, a tubular retainer ring slidably mounted on said housing, means connecting said retainer ring to said armature and to said friction ring so that movement of said armature moves said friction ring relative to said friction material on said shaft hub, and a return spring bearing on said retainer ring and adapted to move said retainer ring in the opposite direction to that in which said retainer ring is moved by said armature when said armature is energized.

3. A small electro-mechanical connecting device including, driving and driven elements rotatable about a common axis, an armature in the form of an annular disc rotatably mounted on one of said elements, a stationarily mounted housing forming part of a magnetic circuit, a stationary coil disposed adjacent said housing and said armature for attracting said armature on energization of said coil to move said armature, a friction ring connected to one of said elements, a hub connected to the other of said elements and having a flange located adjacent said friction ring, a tubular retainer ring slidably mounted on said device and having connection with said armature and with said friction ring and causing said driving element and said driven element to engage with each other when said coil is electrically energized, and a prestressed wave-shaped retainer spring engaging said retainer ring and urging said retainer ring for movement in the opposite direction to that in which said retainer ring is moved by said armature when said coil is energized.

4. An electro-magnetically operated clutch, including in combination, a driving element, a driven element, clutch means for operatively connecting or disconnecting said driving and driven elements, and means for causing engagement and disengagement of said clutch means including, a stationary housing of material suitable for conducting magnetic flux and having pole faces thereon, a coil of electrically conducting wire wound on said housing so as to induce a magentic flux in said housing when said coil is energized, a ring-shaped armature located opposite the pole faces of said housing for limited movement relative thereto, a light-weight tubular retainer ring slidably mounted on said housing, and means securing said retainer ring to said armature so that said retainer ring is moved by said armature when said coil is energized and thereby causes engagement of said clutch means.

References Cited by the Examiner

UNITED STATES PATENTS

| Re. 19,150 | 5/34 | Furnas. |
|---|---|---|
| 2,705,058 | 3/55 | Harter. |
| 2,847,102 | 8/58 | Tiedeman et al. |
| 2,956,657 | 10/60 | Rudisch. |

DAVID J. WILLIAMOWSKY, *Primary Examiner.*

THOMAS J. HICKEY, *Examiner.*